(No Model.) 2 Sheets—Sheet 1.

D. W. MURPHY.
CAR COUPLING.

No. 590,111. Patented Sept. 14, 1897.

Witnesses
W. M. McNaw
Jas. C. Dawley

Inventor
Danl. W. Murphy,
By his Attorneys
Toulmin & Whittemore

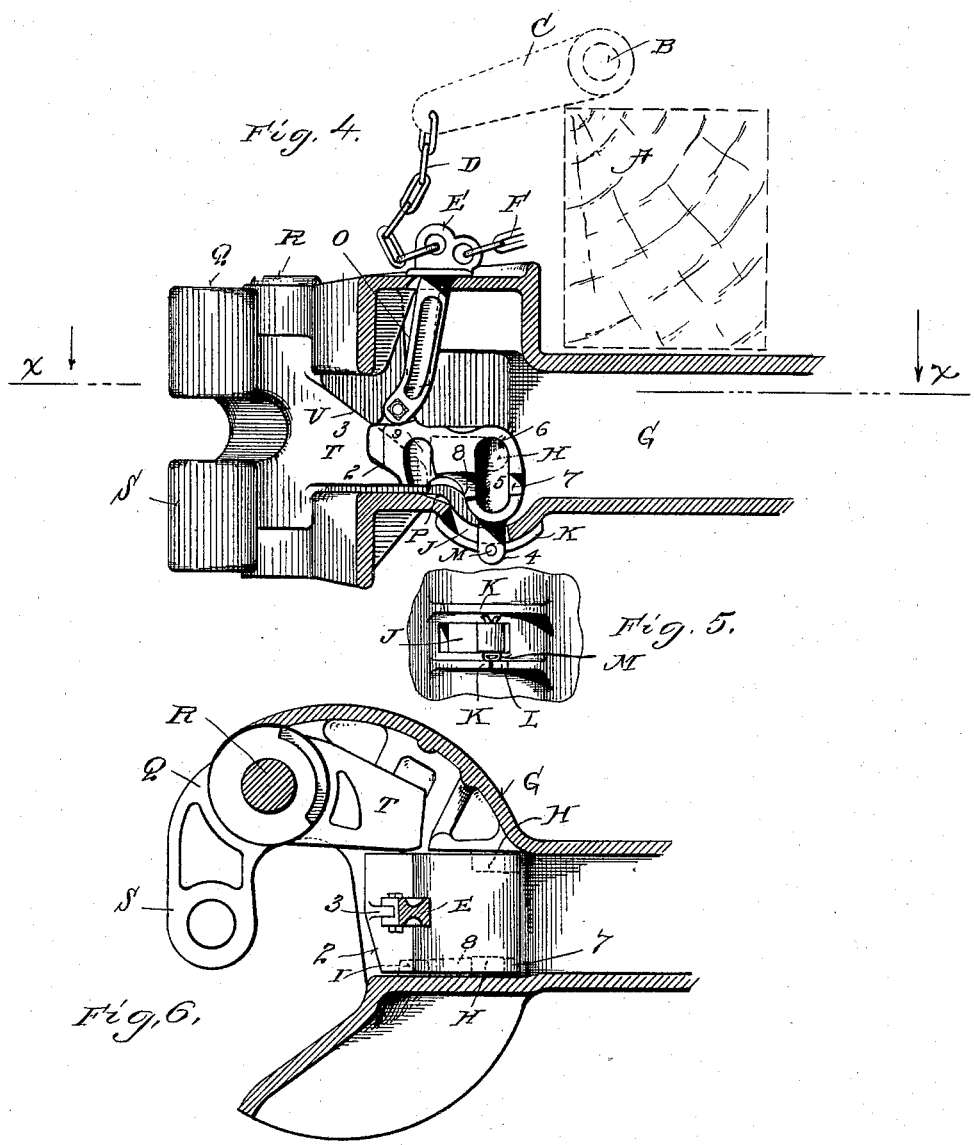

UNITED STATES PATENT OFFICE.

DANIEL W. MURPHY, OF MARION, OHIO, ASSIGNOR TO THE MARION CAR COUPLER COMPANY, OF SAME PLACE.

CAR-COUPLING.

SPECIFICATION forming part of Letters Patent No. 590,111, dated September 14, 1897.

Application filed April 12, 1897. Serial No. 631,682. (No model.)

*To all whom it may concern:*

Be it known that I, DANIEL W. MURPHY, a citizen of the United States, residing at Marion, in the county of Marion and State of Ohio, have invented certain new and useful Improvements in Car-Couplers, of which the following is a specification, reference being had therein to the accompanying drawings.

This invention relates to certain new and useful improvements in car-couplers of the class wherein pivoted knuckles and locking-dogs are employed.

The essential object of my invention is to provide the draw-head with trunnions or studs and the locking-dog with recesses adapting it to be inserted into the draw-head and to be mounted upon such trunnions or studs by the mere act of insertion and manipulation, and this I do for the purpose of simplicity and strength.

Another object of my invention is to provide the draw-head with an additional stud or projection and the locking-dog with an additional recess adapted to fit such stud or projection when in locking position to help resist blows that may be struck against the locking-dog when my coupler is used with an ordinary coupling-link in the coupler of an opposing car.

Another object of my invention is to provide a sliding connection between the draw-head and the lower part of the locking-dog to keep the same from becoming dislodged from the trunnions.

My invention also has other minor objects which will appear hereinafter.

Figure 1:
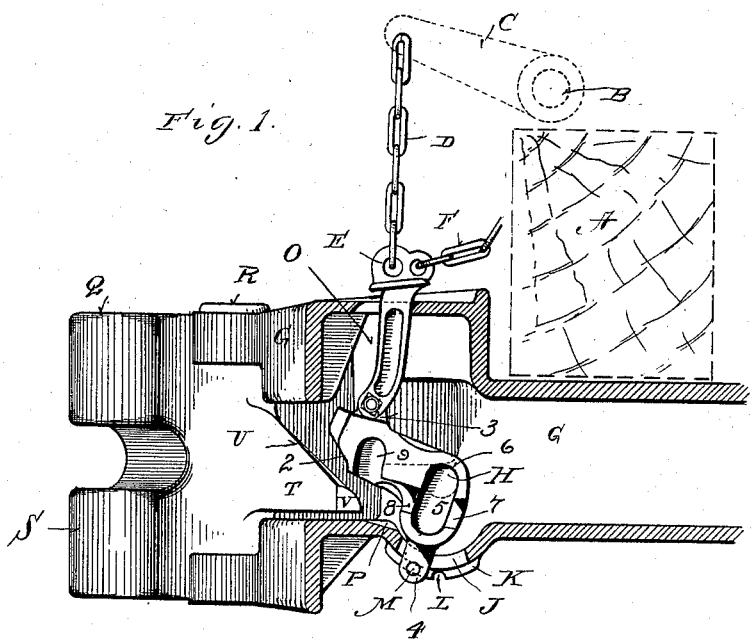
Figure 2:
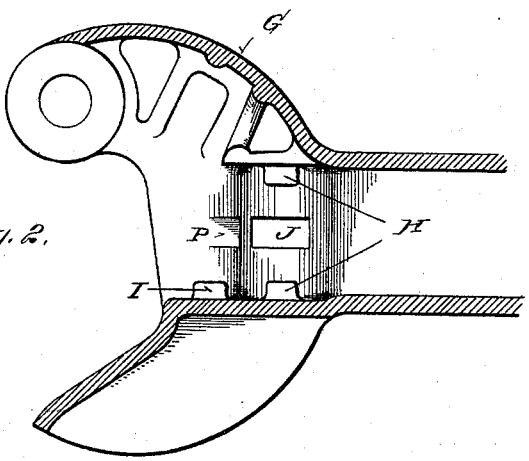
Figure 3:
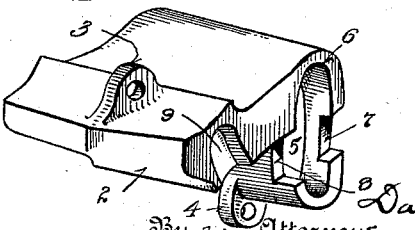

In the accompanying drawings, on which like reference-letters indicate corresponding parts, Figure 1 is a partial side elevation and vertical sectional view of my improved coupler; Fig. 2, a horizontal sectional view of the draw-head; Fig. 3, a detail perspective view of the locking-dog; Fig. 4, a partial side view and vertical sectional view of the coupler with the parts in locking position; Fig. 5, a detail inverted plan view of a portion of the draw-head and locking-dog, and Fig. 6 a horizontal sectional view on the line *x x* of Fig. 4.

In dotted lines I have shown a timber of a car at A, a rock-shaft at B, and a crank-arm at C to operate a chain D, attached to the lifting-pin E. A chain F is also attached to this pin and designed at its other end to be secured to some suitable part of the car, so as to draw the pin out in case the draw-bar breaks away from its connections with the car-body. The connection of this pin with the locking-dog near its front end and the double curved form of the pin permit this chain F to so act on the pin.

A draw-head is shown at G, and as to its outline and exterior formation it may be of such type as to come within the dimensions prescribed by what is known as the "Master Car-Builder's lines." This draw-head I have made and constructed with trunnions H, preferably formed integrally therewith, and a stud or projection I, also preferably formed integral with the draw-head. I have slotted this head at J and formed on the lower side two ribs K, one of which is notched at L to permit a cotter-pin M to be inserted to the position shown in Fig. 5, which is between these ribs. The ribs protect the cotter-pin from being broken or injured. I also provide the draw-head with pillars or stops O, one on each side, which limit the upward adjustment of a certain locking-dog, to be presently described. The draw-bar is also channeled out at P (see Figs. 1, 2, and 4) to enable the more ready insertion of the locking-dog.

A knuckle Q is pivoted upon a pin R in the draw-head and has the usual coupling-horn S and locking-horn T. This latter horn I incline, as shown at U, and bevel, as shown at V, in Fig. 1, to enable it to swing in and sufficiently lift the locking-dog as to pass under it, so that the dog may drop down in front of it, as shown in Figs. 4 and 6.

This brings me to a description of the locking-dog itself and to the manner of mounting it in the head. This draw-head consists of a block of metal fashioned, as particularly shown in Fig. 3, and has an inclined surface 2, which is the surface that is engaged by the incline U and bevel V. This dog at the top has a lug 3, pivoted to the lower end of the lifting-pin E, and at the bottom has a lug 4 which extends through the slot J and receives the cotter-pin M. This prevents the dog from lifting up at the rear end and from jarring out of position by any possibility. The dog further has at each side a recess 5, in the upper part 6 of which are fitted the trunnions H. To permit the dog to pass the trunnions H in the act of mounting the dog, the latter is cut away at 7, as shown in Fig. 3 and in dotted lines in Fig. 6. It is also cut away at 8 at one side to permit it to pass the stud or projection. The dog is further recessed at 9 to fit upon the stud I. Now to insert the locking-dog into the head the knuckle is moved out of the way and the dog is pushed back into the head, sliding the lug 4 through the channel P and dropping it into the slot J. The recess 7 passes on one side the stud I and on both sides next passes the two trunnions. The dog is then settled down until the parts 6 of the recesses 5 receive the trunnions H and the recess 9 receives the stud I. The cotter-pin M is then inserted, as above described, and the dog is mounted. The pin E is then attached.

The operation is as follows: Referring particularly to Figs. 1, 4, and 6, it will be seen that in the latter two figures the knuckle is shown locked in coupled position as the locking-dog is in front of the locking-horn T. To uncouple or swing the knuckle outward the pin E is elevated by either of the chains, lifting the locking-dog by turning it on the trunnions H to the position shown in Fig. 1. The knuckle may then swing outward. Then the dog is allowed to drop down to the position shown in Fig. 4. When the knuckle is struck by an opposing knuckle or car the knuckle U and bevel V of the horn T engage with the face 2 of the dog and lift the same enough for the horn to pass under it to the position shown in Fig. 6, when the dog drops down. Thus my coupler is purely automatic in coupling.

The coupling-dog is practically a solid block of metal and is therefore very strong, and as it turns on trunnions integral, preferably, with the head, its pivotal connection with the head possesses great strength, while, when the dog is down, the stud I additionally sustains it against accidental blows that it may receive from the ordinary coupling-link when my coupler is used with a car having the old-fashioned link draw-head.

Having thus fully described my invention, what I claim as new, and desire to secure by Letters Patent, is—

1. In a car-coupler, the combination with a draw-head, of a locking-dog pivoted therein and for that purpose provided with recesses in its sides and trunnions on the draw-head fitting in said recesses.

2. In a car-coupler, the combination with a draw-head of a locking-dog pivotally mounted therein and having recesses in each side and an additional recess in one side, and trunnions on the draw-head for the opposite recesses and a third trunnion for the additional recess.

3. In a car-coupler, the combination with the draw-head, of a locking-dog pivoted therein, and having recesses in each side, an additional recess in one side, a cut-away place to give access to said recesses, and trunnions and a stud carried by the head and adapted to fit two of the recesses, and the stud adapted to fit the additional recess.

4. In a car-coupler, the combination with a draw-head, of a locking-dog therein, the head having a slot in the bottom wall and having trunnions, and the dog having recesses in its sides in which said trunnions fit and having also a shank extending through said slot, and a device to prevent upward withdrawal of the shank through the slot.

5. In a car-coupler, the combination with a draw-head, of a locking-dog consisting of a block of metal with recesses 5, 6, 9 and cut-away parts 7 and 8, and integral trunnions H and an integral stud I on the draw-head, the dog being insertible into the draw-head and adapted to be mounted upon said trunnions and to be additionally sustained by said stud.

6. In a car-coupler, the combination with a draw-head having trunnions, stops and a stud, of a locking-dog having opposite recesses which receive said trunnions and an additional recess for said stud and adapted to pivot on the trunnions and be limited by said stops.

7. In a car-coupler, the combination with a draw-head, a knuckle pivoted therein, the draw-head having trunnions, of a locking-dog having recesses in its opposite faces which receive said trunnions, a pin secured to the dog and extending out through the head, and means to actuate said pin.

In testimony whereof I affix my signature in presence of two witnesses.

DANIEL W. MURPHY.

Witnesses:
J. A. SCHROETER,
J. F. PIMDERYOST.